United States Patent
Guerrini et al.

(10) Patent No.: US 10,480,932 B2
(45) Date of Patent: Nov. 19, 2019

(54) AUTOMATED COMPUTATION OF A DIMENSION OF A MOVING PLATFORM

(71) Applicant: THALES, Courbevoie (FR)

(72) Inventors: Gilles Guerrini, Pessac (FR); Vincent Corretja, Pessac (FR); Richard Montigny, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/487,938

(22) Filed: Apr. 14, 2017

(65) Prior Publication Data
US 2017/0299372 A1    Oct. 19, 2017

(30) Foreign Application Priority Data
Apr. 19, 2016   (FR) ..................... 16 00650

(51) Int. Cl.
*G06F 19/00*   (2018.01)
*G01B 11/02*   (2006.01)
(Continued)

(52) U.S. Cl.
CPC ............ *G01B 11/026* (2013.01); *G01B 11/04* (2013.01); *G01S 7/411* (2013.01); *G01S 13/08* (2013.01); *G01S 13/917* (2019.05); *G08G 3/00* (2013.01)

(58) Field of Classification Search
CPC ........ G01V 13/888; G01S 13/32; G01S 13/42
(Continued)

(56) References Cited

U.S. PATENT DOCUMENTS 5,337,654 A   8/1994 Broberg et al.
5,402,346 A   3/1995 Lion et al.
(Continued)

FOREIGN PATENT DOCUMENTS

EP    2 523 016 A2   11/2012
FR    2 695 742 A1    3/1994

OTHER PUBLICATIONS

Liao Kuo et al.: "Extraction of Radar Target Length Based on High Resolution Range Profile", Electrical and Control Engineering (ICECE), 2010 International Conference on, IEEE, Piscataway, NJ, USA, Jun. 25, 2010 (Jun. 25, 2010), pp. 956-959, XP031797655, *ISBN : 978-I-4244-6880-5.
(Continued)

*Primary Examiner* — Edward Raymond
(74) *Attorney, Agent, or Firm* — Young & Thompson

(57) ABSTRACT

Disclosed is a method and a system for the automated computation of a length or width dimension of a moving platform. The method includes sending radio waves toward the platform along a predetermined transmission axis and acquiring at least one digital power profile signal representative of a received reflected signal power as a function of a radial distance along the transmission axis relative to a reference point. This method next includes applying a filtering operator on the acquired digital power profile signal, making it possible to obtain a filtered digital signal, determining, by computation, a first radial distance corresponding to a first variation peak of the filtered digital signal and a second radial distance corresponding to a second variation peak of the filtered digital signal, and the computing a radial dimension of the platform as a function of the first and second radial distances.

14 Claims, 6 Drawing Sheets

(51) Int. Cl.
*G01B 11/04* (2006.01)
*G01S 13/08* (2006.01)
*G01S 7/41* (2006.01)
*G01S 13/91* (2006.01)
*G08G 3/00* (2006.01)

(58) Field of Classification Search
USPC .................................. 702/159, 150, 182–185
See application file for complete search history.

(56) References Cited

U.S. PATENT DOCUMENTS

| 8,314,732 | B2* | 11/2012 | Oswald | G01S 7/2926 342/114 |
| 8,779,965 | B2* | 7/2014 | Sentelle | G01S 13/32 242/128 |

| 2003/0142007 | A1 | 7/2003 | Ono et al. |
| 2004/0140927 | A1 | 7/2004 | Meineck et al. |
| 2010/0052977 | A1 | 3/2010 | Sathyendra |

OTHER PUBLICATIONS

Musman S et al.: "Automatic Recognition of ISAR Ship Images", IEEE Transactions on Aerospace and Electronic Systems, IETE Service Center, Piscataway, NJ, US, vol. 32, No. 4, Oct. 1, 1996 (Oct. 1, 1996), pp. L392-r404, XP011081057, *ISSN: 0018-9251, p. 1398, p. 1401.

Gouaillier V et al.: "Ship Silhouette Recognition Using Principal Components Analysis", Optomechatrontc MRCRO/NANO Devices and Components III : Oct. 8-10, 2007, Lausanne, Switzerland; [Proceedings of SPIE , ISSN 0277-786], SPIE, Bellingham, Wash, vol. 3164, Jan. 1, 1997 (Jan. 1, 1997) , pp. 59-69, XP002413964.

FR Search Report, dated Nov. 9, 2016, from corresponding FR application.

* cited by examiner

AUTOMATED COMPUTATION OF A DIMENSION OF A MOVING PLATFORM

FIELD OF THE INVENTION

The present invention relates to a method for the automatic computation of a dimension of a moving platform, said dimension being a length dimension or a width dimension, and an associated system.

BACKGROUND OF THE INVENTION

The invention falls within the surveillance field, in particular maritime surveillance when the platform in question is a ship.

In the context of maritime surveillance, the ships supply self-declarative information providing the identification, position, route and dimensions (length and width) of the ship, according to an automated identification system (AIS).

It is useful to be able to verify this information supplied by a ship, in order to detect suspicious ships, in a civilian or military context.

To that end, it is known to use information supplied by a radar system. In a known manner, a radar system includes a transmitter able to transmit electromagnetic radio waves, and a receiver for reflected electromagnetic radio waves, and computation means making it possible to determine the power backscattered by a target based on the distance between the latter and the radar.

Such an operating mode of a radar system is known by the name "range-profile" mode. The definition of the range-profile corresponds to the depiction of the power backscattered by the detected platform as a function of the distance. The range-profile of a target can only be established when it has been detected beforehand using a detection mode.

In the state of the art, it is known to provide a signal of the "range-profile" type to an operator, on a graphic display interface, the operator then being able to move cursors on the graphic interface to perform a manual estimate of the dimension, for example the length, of the observed ship.

Indeed, based on the position of the radar system relative to the axis of the observed ship, the radar system makes it possible to detect the length or width of the ship, or more generally of the observed platform.

It is then possible for the operator to compare the computed dimension with a corresponding dimension, obtained from the AIS identifier received from the observed ship.

However, such a manual operation takes time from the operator, and can also be imprecise.

In addition, in the maritime context, radar measurements are noisy due to the environment (presence of sea clutter), and it is therefore difficult for a human operator to effectively use a noisy signal displayed on a graphic interface.

It is therefore desirable to automate the estimation of dimensions of a moving platform such as a ship, to avoid the aforementioned hazards.

More generally, in the field of remote monitoring, it is desirable to be able to estimate the dimensions of a moving platform automatically, in particular in environments where radar measurements are noisy.

To that end, according to a first aspect, the invention proposes a method for automatically computing a dimension of a moving platform, said dimension being a length dimension or a width dimension, including a step for sending, by a radar system, electromagnetic radio waves toward said platform along a predetermined transmission axis and acquiring at least one digital power profile signal representative of a received reflected signal power as a function of a radial distance along said transmission axis relative to a reference point of said radar system. The method includes the following steps:

applying a filtering operator on the acquired digital power profile signal making it possible to obtain a filtered digital signal, determining, by computation, a first radial distance corresponding to a first variation peak of the filtered digital signal and a second radial distance corresponding to a second variation peak of the filtered digital signal, computing a radial dimension of the platform as a function of said first and second radial distances.

Advantageously, the method according to the invention makes it possible, owing to the application of a filtering operator, to obtain a filtered signal that makes it possible to minimize the influence of the noise and sea clutter, and to process the filtered signal automatically to obtain a dimension of the observed platform.

SUMMARY OF THE INVENTION

The method for automatically computing a dimension of a moving platform according to the invention may have one or more of the features below, considered independently or in all technically acceptable combinations.

It comprises acquiring a plurality of digital power profile signals, and the steps for applying a filtering operator and determining a first and second radial distance are applied for each acquired digital power profile signal.

The computation of a radial dimension of the platform comprises computing an estimated radial length value for each acquired digital power profile signal by obtaining a difference between the second radial distance and the first radial distance, and storing the estimated radial length value for each acquired digital power profile signal.

The method comprises computing a final estimated radial length from stored estimated radial length values.

The final estimated radial length is equal to the median of the stored estimated radial length values.

The method comprises a step for statistical validation of the stored estimated radial length values, and a step for assigning a confidence score associated with the final estimated radial length.

The statistical validation step comprises computing a histogram of the estimated radial length values, and computing at least one dispersion parameter associated with said histogram.

The first radial distance is the smallest radial distance corresponding to a variation peak of the filtered digital signal, and the second radial distance is the largest radial distance corresponding to a variation peak of the filtered digital signal.

The step for determining, by computation, a first radial distance corresponding to a first variation peak of the filtered digital signal and a second radial distance corresponding to a second variation peak of the filtered digital signal comprises a computation, done by applying a sliding window, of a partial discrete integral value of the filtered digital signal comprised in said sliding window and a comparison of the partial integral value to a predetermined variation threshold.

The predetermined variation threshold is computed as a function of the total discrete interval of the filtered digital signal.

The method further includes a step for computing a length dimension or a width dimension as a function of the computed radial dimension and a step for estimating the correlation between the computed length or width dimension and an anticipated length or width dimension, and raising an alert as a function of the result of the estimate correlation step.

According to another aspect, the invention relates to a computer program including software instructions which, when executed by a programmable device, carry out a method for the automatic computation of a dimension of a moving platform, said dimension being a length dimension or a width dimension, as briefly described above.

According to another aspect, the invention relates to an information recording medium, including software instructions for carrying out an automated method for computing a dimension of a moving platform as briefly described above, when these instructions are executed by a programmable device.

According to another aspect, the invention relates to a system for computing a dimension of a moving platform able to carry out a method as briefly described above.

This system includes a computing and processing unit including a processor and one or several memory units able to store data and program code instructions, implementing:
- a module for applying a filtering operator on the acquired digital power profile signal making it possible to obtain a filtered digital signal,
- a module for determining, by computation, a first radial distance corresponding to a first variation peak of the filtered digital signal and a second radial distance corresponding to a second variation peak of the filtered digital signal, and
- a module for computing a radial dimension of the platform as a function of said first and second radial distances.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF THE INVENTION

Figure 1:
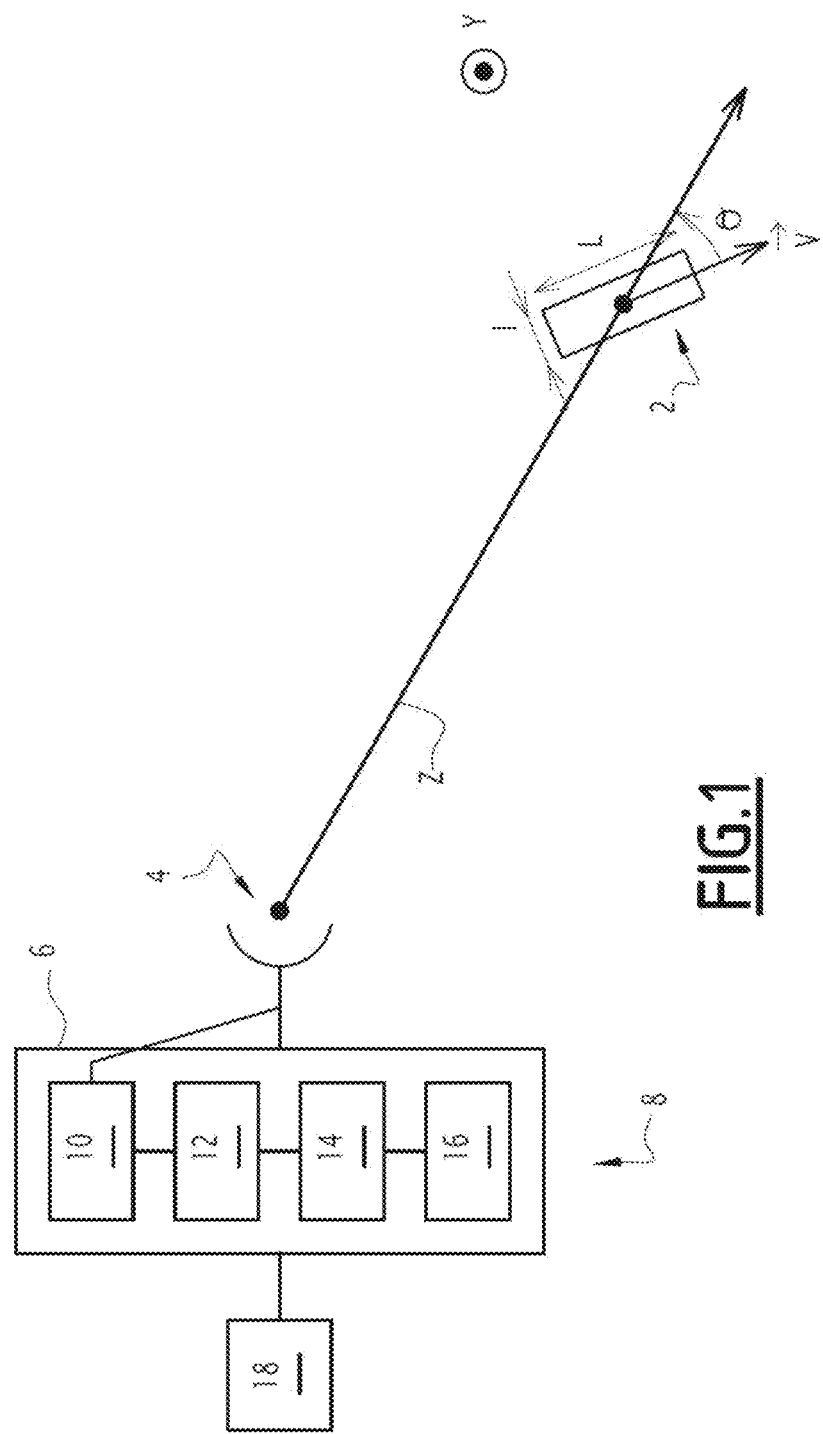
FIG. 1 is a schematic top view of one usage scenario of the present invention, comprising a platform and a radar device transceiver antenna.

FIG. 1 shows a schematic top view of a platform 2, for example a ship navigating at sea, for which one wishes to evaluate one of the dimensions from among its length L and its width I.

The platform 2 is schematically represented in the form of a rectangle in top view.

The length L and the width I of an actual platform are defined by the corresponding dimensions of a rectangle marked out on the platform, in top view.

When the platform 2 is moving, this movement is characterized by a speed vector $\vec{V}$.

An electromagnetic radio wave transceiver antenna 4, which is part of a radar system 8, is able to send electromagnetic radio waves to the platform 2 and to receive waves reflected by any encountered reflective structure.

In the example of FIG. 1, the transmission axis or aiming direction of the antenna 4 is referenced Z.

The axis Z forms, with the direction of the speed vector $\vec{V}$ of the platform 2, an angle $\theta$.

The antenna 4 is coupled to a radar device 6, the set of elements 4 and 6 forming the radar system 8.

In a known manner, the radar system 8 is suitable for determining the value of the speed vector $\vec{V}$ of the platform 2 projected on the axis Z.

The radar system 8 is suitable for acquiring a so-called "range profile" digital signal, representing the power of the reflected signal in response to a transmitted electromagnetic radio signal, as a function of the distance relative to a reference point of the antenna 4.

The radar device 6 in particular includes transceiver modules 10, signal modulation/demodulation modules 12, a computing and processing unit 14 including a processor and able to perform computations when the device 6 is powered on, one or several memory units 16 able to store data and program code instructions.

Optionally, the radar device 6 also includes or is connected to a man-machine interface 18, including a display screen and means for interacting with an operator.

The radar system 8 is for example placed on board a surveillance carrier (not shown), which may be stationary or moving.

In one embodiment, some of the modules of the device 6 are implemented independently, for example the man-machine interface, the memory units 16 and the computing unit 14 are outside the device 6 and are part of a dedicated programmable device, for example a computer.

In one operating mode, the radar device 6 provides an electromagnetic radio signal to be transmitted along the aiming direction Z of the antenna 4, and as a function of the reflected signal obtained by the receiving module 10, generates a digital signal representative of the power of the signal received by the antenna as a function of a radial distance, hereinafter called acquired power profile signal.

Figure 2:
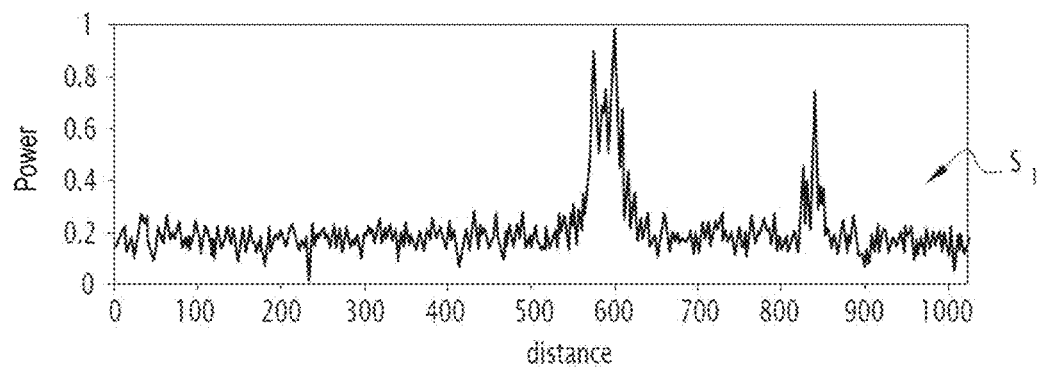
FIG. 2 is an example acquired radar signal before and after noise suppression filtering.
Figure 2:
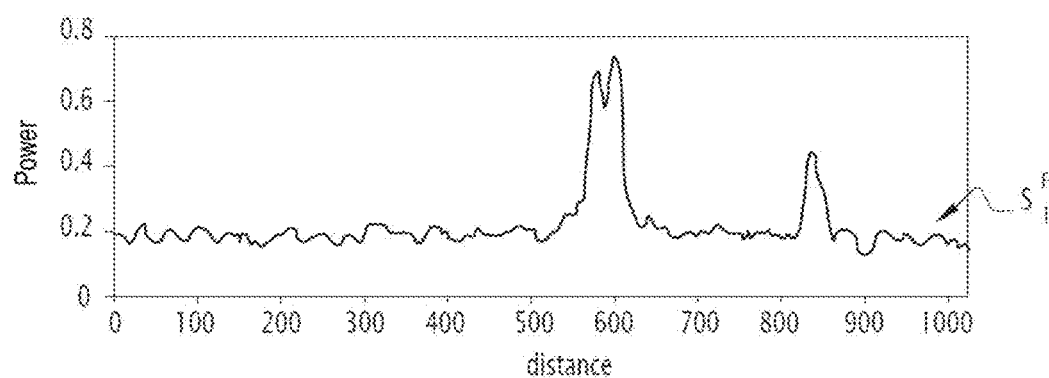

FIG. 2 shows an example acquired digital power profile signal $S_1$, representative of the normalized power (y-axis) of the signal received by the antenna 4 as a function of the radial distance d (x-axis), between a reference point of the antenna 4 and a spatial reflection point an axis parallel to the axis Z.

The acquired digital power profile signal is noisy, and a direct detection of a radial dimension of the platform from this noisy signal may be erroneous.

The digital power profile signal $S_1$ includes zones in which it has a low amplitude, corresponding to noise and sea scatter, and zones with increased amplitude, corresponding to reflective obstacles on the path of the transmitted electromagnetic radio waves.

In particular, if the platform 2 is a ship, the power increases correspond to structural elements of the ship, which rise in the direction Y perpendicular to the direction Z relative to the basic structure of a ship, which is at sea level.

For example, reflective metal structural elements rise at the bow and the stern of a ship, making it possible to indicate the ends of the ship along the observation axis Z and to deduce the corresponding radial dimension there from.

Advantageously, according to the invention, the acquired digital power profile signal is filtered by a filtering operator making it possible to minimize the influence of the noise, as explained in detail below.

FIG. 2 schematically illustrates a noise-suppressed version via median filtering $S_1^F$ corresponding to the acquired digital power profile signal $S_1$. The signal $S_1^F$ is depicted in the same referential as the acquired digital power profile signal $S_1$, including the normalized power of the signal on the y-axis and the radial distance relative to a reference point of the antenna 4 on the x-axis.

Figure 3:
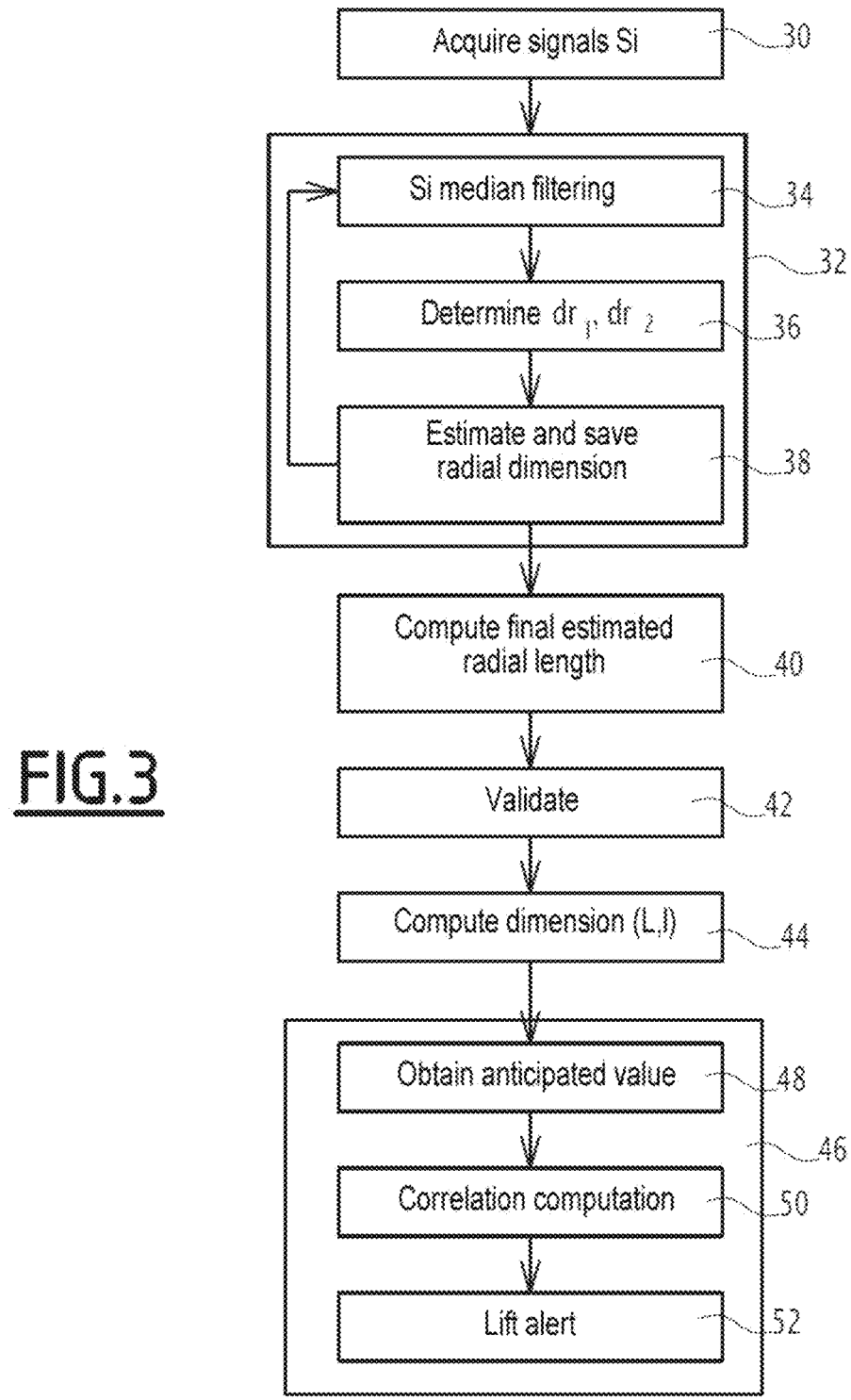
FIG. 3 is a flowchart of the main steps of a method for computing dimensions of a platform according to one embodiment.

FIG. 3 is a flowchart of the main steps of a method for the automated computation of one dimension from among a length dimension and a width dimension of the moving platform according to a first embodiment.

This method is for example carried out by a software program able to be executed by a processor of a programmable device when it is powered on.

During a first step 30, N digital power profile signals are acquired by the radar system 8.

Preferably, if the automated measurement of ship dimensions is applied in the maritime field, the number N is strictly greater than 1, and preferably greater than 10. Indeed, the acquisition of the signals being noisy, it is advantageous to have a plurality of signals to obtain a reliable estimate.

One thus obtains a set of digital power profile signals $S_i$, $1 \leq i \leq N$.

Each power profile signal $S_i$ is made up of samples $S_i(k)$, with k comprised between 1 and P, P being the length of the signal $S_i$, each index k corresponding to a radial distance relative to a reference point of the antenna, as explained above.

The acquisition step 30 is followed by a step 32 for computing a radial dimension of the observed platform from each acquired digital power profile signal.

Step 32 itself is made up of several steps.

First, a noise reducing filtering operator is applied to the digital power profile signal acquired in step 34. In the case of application to the automated measurement of the dimensions of a ship, the "noise" refers to the sea scatter and the thermal noise from the RADAR.

Noise reduction filtering is for example filtering using a median filter, the principle of which is to define a sliding window with a selected size r, consider the sub-signal intercepted by the window, and replace the central sample of the sub-signal with the median value of the sub-signal.

Preferably, r is an odd integer.

At the end of the filtering step, a filtered digital signal $S_i^F$ of P samples $\{S_i^F(k), 1 \leq k \leq P\}$ is obtained.

Thus, the extreme amplitude values, corresponding to measurement disruptions, are eliminated.

The larger the size r of the filtering window is, the more the signal is smoothed, which makes it possible to attenuate the noise, but risks losing information on the detected target.

Preferably, r is less than or equal to 10% of P. For example, r=15.

Advantageously, the median filtering is an easy-to-implement filtering, which does not require significant computing resources and has a short computing time.

Alternatively, a filtering operator other than median filtering is applied, for example a mean filter.

Next, during a step 36, the two ends of the surveilled platform are detected along the observation axis, these ends hypothetically corresponding to significant variations of the filtered digital signal from step 34.

More specifically, one determines radial end distances, i.e., a first radial distance $dr_1$ corresponding to a first variation peak of the filtered digital signal and a second radial distance $dr_2$ corresponding to a second variation peak of the filtered digital signal.

The first distance $dr_1$ is the smallest radial distance corresponding to a variation peak of the filtered digital signal, and the second distance $dr_2$ is the largest radial distance corresponding to a variation peak of the filtered digital signal.

Figure 4:
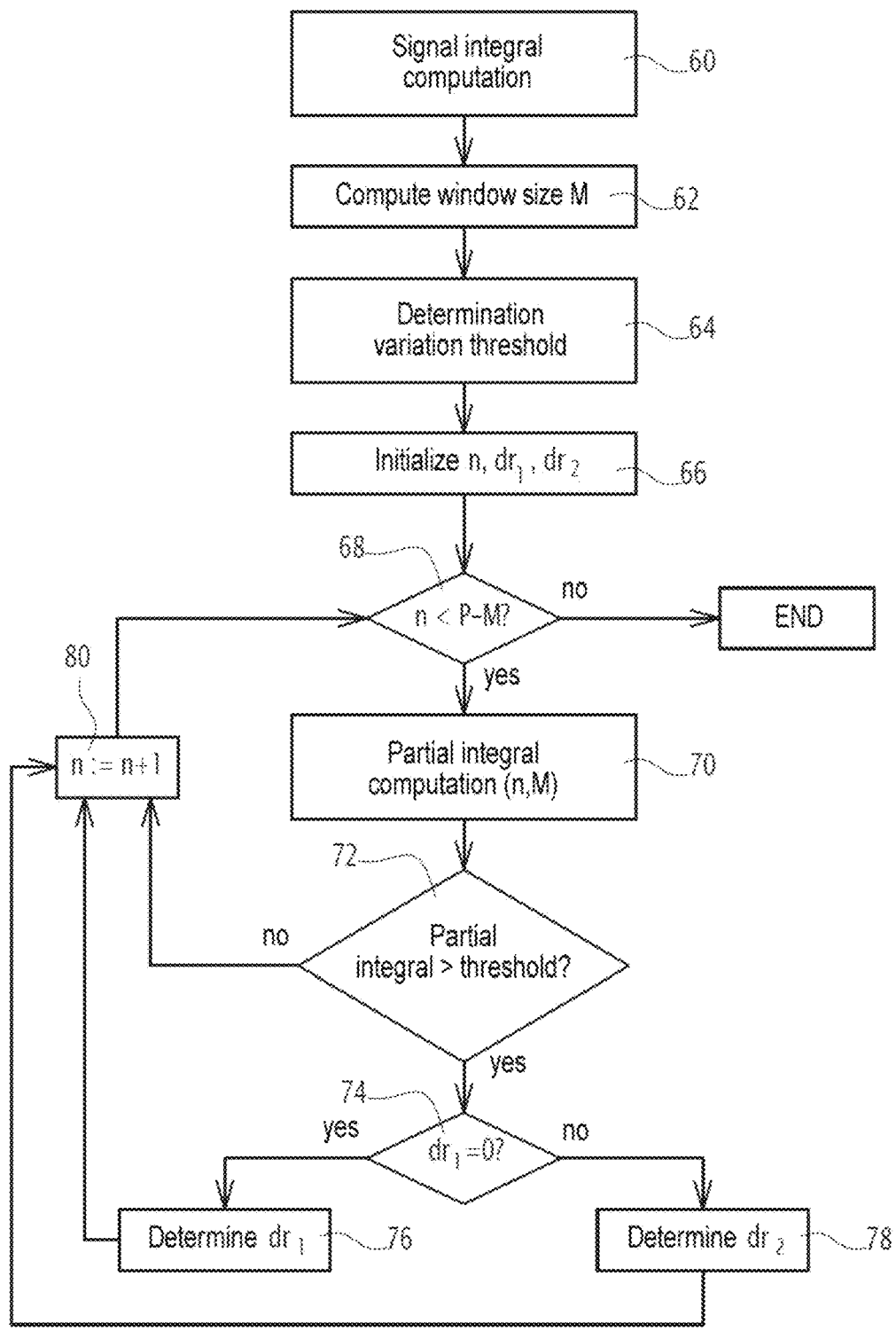
FIG. 4 is a flowchart of the main steps carried out for the automatic estimation of radial distances corresponding to a platform in one embodiment.

To that end, a discrete integral computation with thresholding is carried out in one embodiment illustrated in detail in FIG. 4.

FIG. 4 describes the main steps of the determination of the first and second radial distances according to one embodiment of the invention, for a filtered digital signal $S_i^F$ of P samples, each sample value being equal to a normalized received power for a radial distance of the reference point of the antenna previously mentioned.

During a first step 60, the discrete integral $Int_t(S_i^F)$ of the digital signal $S_i^F$ is computed:

$$Int_t(S_i^F) = \sum_{k=1}^{P} S_i^F(k)$$

Next, a partial integral computation window size is defined in step 62, as a function of the length P of the filtered digital signal:

$$M = \left\lfloor \frac{x}{100} \times P \right\rfloor$$

Preferably, x is less than or equal to 10% of P.

During a variation threshold determination step 64, a variation threshold $Int_{seuil}^i$ is set.

In one embodiment, the variation threshold $Int_{seuil}^i$ is a constant value $Int_{seuil}$ obtained from a memory or supplied by an operator, and used for each power profile signal $S_i$.

Alternatively, the variation threshold $Int_{seuil}^i$ is computed from the discrete integral value $Int_t(S_i^F)$:

$$Int_{seuil}^i = \frac{y}{100} \times Int_i(S_i^F)$$

where y is a real number. Preferably, y is less than or equal to 10% of P.

In the initialization step 66, a loop index n is initialized at 1, and the radial distance values $dr_1$ and $dr_2$ are initialized at 0.

In step 68, it is verified whether n is less than P-M, and in case of negative verification, the method ends.

In case of positive verification, the partial discrete integral, equal to the discrete integral of the filtered digital signal comprised in the window of M samples starting from the sample with index n, is computed in the partial integral computation step 70:

$$Int_p(S_i^F, n) = \sum_{k=n}^{n+M} S_i^F(k)$$

It is next verified, in step 72, whether the computed partial discrete integral exceeds the variation threshold $Int_{seuil}^i$ previously computed.

In case of positive verification in step 72, it is verified in step 74 whether $dr_1=0$, and in case of positive verification in step 74, one goes on to step 76 for determining the first radial distance at which $dr_1$ is placed at the radial distance corresponding to the index $$p_1 = n + \left\lfloor \frac{M}{2} \right\rfloor,$$

this index corresponding to the middle of the window with size M for the partial discrete integral computation.

In case of negative verification in step 74, one goes on to step 78 for determining the second radial distance at which the value of $dr_2$ is placed at the radial distance corresponding to the index $$p_1 = n + \left\lfloor \frac{M}{2} \right\rfloor.$$

In case of negative verification in step 72, this step 72 is followed by step 80 of incrementing the index n by one, which in turn is followed by step 68 previously described.

Furthermore, steps 76 and 78 are both followed by step 80 for incrementing the index n.

This method makes it possible to determine the first distance $dr_1$ corresponding to the first variation value exceeding the variation threshold encountered when processing the data in the increasing order of radial distances, and the second distance $dr_2$ corresponding to the last variation value exceeding the variation threshold encountered when processing the data in the increasing order of radial distances.

Of course, various alternative embodiments within the reach of one skilled in the art can be considered to compute the first and second radial distances.

Returning to FIG. 3, at the end of step 36, the first distance $dr_1$ corresponding to a first end of the platform, and the second distance $dr_2$ corresponding to a second end of the platform, are stored.

In step 38 for estimating a radial length dimension of the targeted platform, a value $L_R^i$ is deduced from this from the digital signal $S_i$ through the following simple computation:

$$L_R^i = dr_2 - dr_1$$

The estimated radial length $L_R^i$ is stored in a memory of the programmable device implementing the method according to the invention.

Step 34 to 38 are carried out for each acquired digital power profile signal $S_i$; step 38 is therefore followed by step 34 with a value i incremented by one as long as i remains below or equal to the number of acquisition N.

Once all of the acquired digital power profile signals have been processed, step 38 is followed by a step 40 for computing a final estimated radial length from estimated radial length values, and a step 42 for statistical validation of the final estimated radial length.

During step 40, the final estimated radial length $L_R$ is computed as being equal to the median value of the previously stored estimated radial length values.

Alternatively, another statistical estimator is used to determine the final estimated radial length $L_R$ from estimated radial lengths $L_R^i$, for example the mean.

Next, during the statistical validation step 42, a histogram of the estimated radial length values $L_R^i$ is computed, and the dispersion of the values of the histogram relative to the median value is evaluated.

Dispersion parameters are computed.

In one embodiment, the dispersion is characterized by the parameter $E_1$ defined from the interquartile deviation, the computation of which is defined as follows:

$$E_1 = Q_3 - Q_1$$

Where $Q_1$ represents the first quartile, i.e., the first value (in increasing order) of a series greater than or equal to 25% of the data, and $Q_3$ represents the third quartile, i.e., the first value (in increasing order) of a series greater than or equal to 75% of the data. In other words, the interquartile deviation indicates the width of the interval in which the central 50% of the values are found.

According to one alternative, another method consists of evaluating the deviation between the mean and the median of the values of the histogram. If there is a significant difference between the mean and the median, this means that there is a strong dispersion, and potentially several poles not making it possible to rule on the final estimated radial length.

Of course, it is possible to use any other alternatives within the reach of one skilled in the art to estimate the dispersion of the histogram.

Thus, the coherence of the estimated radial length values is evaluated, which makes it possible to validate or invalidate the estimates, and associate a confidence score with the final estimated radial value $L_R$ of the platform.

In one embodiment, several confidence scores are predefined, a first score corresponding to a high confidence, a second score corresponding to a medium confidence, and a third score corresponding to a low confidence.

When the interquartile deviation parameter $E_1$ is used to estimate the dispersion, two threshold interquartile deviation values $E_{1,1}$ and $E_{1,2}$ are defined.

For example, the threshold values $E_{1,1}$ and $E_{1,2}$ are defined beforehand, either by theoretical computation, or from test observations.

When the value of $E_1$ is less than $E_{1,1}$, the first score is associated with the final estimated radial length $L_R$.

When the value of $E_1$ is greater than $E_{1,1}$, but less than a second threshold value $E_{1,2}$, the second score is associated with the final estimated radial length $L_R$.

When the value of $E_1$ is greater than $E_{1,1}$, the third score is associated with the final estimated radial length $L_R$.

Figure 5:
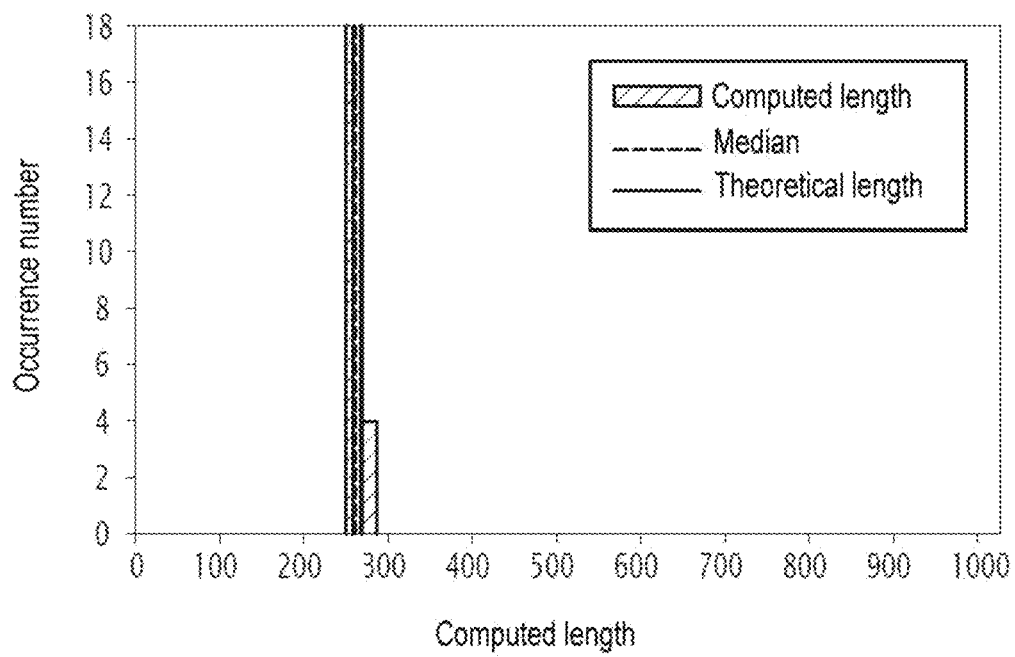
FIGS. 5 to 7 illustrate histograms of estimated radial length values.
Figure 6:
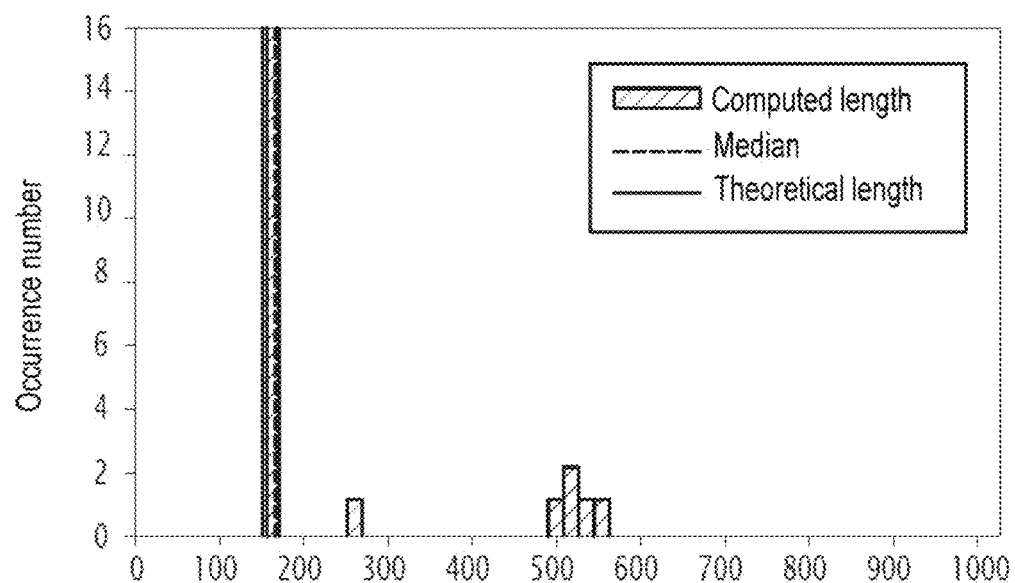
Figure 7:
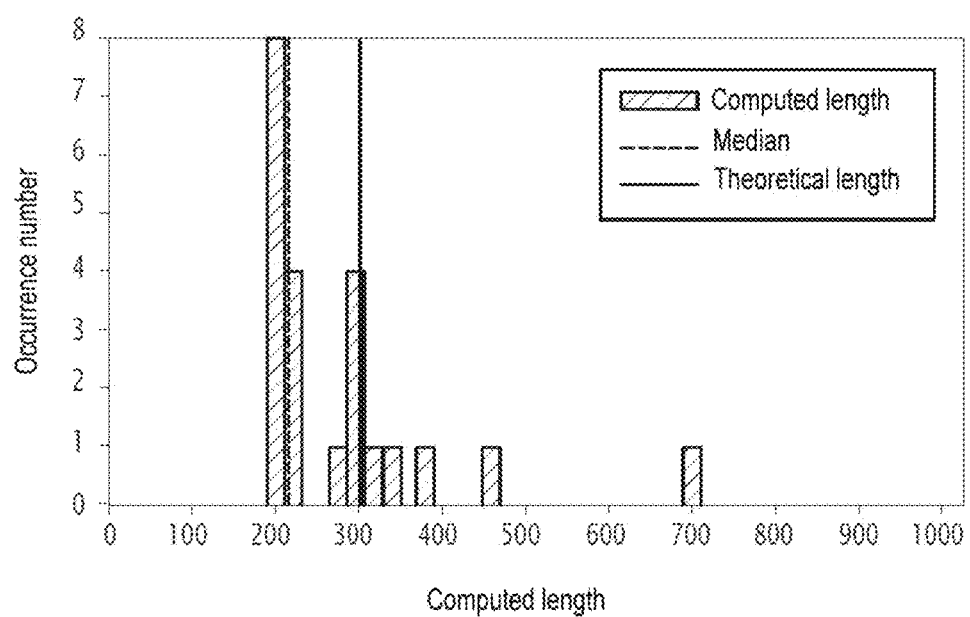

Several scenarios are illustrated in FIGS. 5 to 7.

According to a first scenario, the histogram includes a single pole centered on the median value, as schematically illustrated in FIG. 5.

In this first case, the estimates are validated and the interquartile deviation $E_1$ is below the first threshold $E_{1,1}$. It is possible to deduce that the median of the estimated radial length values is a representative estimate of the radial length $L_R$ of the platform. The first confidence score is associated with the final estimated radial length.

According to a second scenario, the histogram includes two poles, including one majority pole centered on the median value, and one minority pole, as schematically illustrated in FIG. 6.

In this second case, the interquartile deviation $E_1$ is above the first threshold $E_{1,1}$ but below the second threshold $E_{1,2}$;

the final estimated radial length is validated, since it belongs to the majority pole, but with a lower quality score than in the first case. The second confidence score, lower than the first confidence score, is associated with it.

According to a third scenario, the histogram includes a several poles with no majority pole, and therefore has a significant dispersion, as schematically illustrated in FIG. 7.

In this third case, the interquartile deviation $E_1$ is above the second threshold $E_{1,2}$, the median value of the distribution of the estimated radial length values is not an estimate representative of the radial length of the platform, the estimates are noisy. A lower confidence score then in the other cases will be associated with the final estimated radial length. The third confidence score, lower than the second confidence score, is associated with it.

Next, a dimension of the platform from among its length or its width is computed in step 44 based on the final estimated radial length $L_R$.

The selection of the estimated dimension from among the length L and the width I depends on the angle $\theta$ between the axis Z and the direction of the speed vector $\vec{V}$ of the platform 2.

If the value of the angle $\theta$ is less than or equal to 45°, the length L of the platform is estimated by:

$$L = \frac{L_R}{\cos(\theta)}$$

If the value of the angle $\theta$ is strictly greater than 45°, the width I of the platform is estimated by:

$$l = L_R \times \sin(\theta)$$

For the dimension of the platform, L or I, thus computed automatically, the confidence score previously evaluated is retained.

Next, the dimension of the platform and its confidence score are provided to a step 46 for implementing these values for surveillance.

In one embodiment, when the considered platform is a ship, step 46 comprises obtaining, during a step 48, the corresponding anticipated length value, denoted $L_{init}$, or width value, denoted $I_{init}$, from data of the AIS type corresponding to an identifier transmitted by the ship 2.

According to one embodiment, step 48 is only carried out if the confidence score assigned to the dimension of the computed platform is greater than or equal to a threshold, for example greater than or equal to the second score described above.

The correlation between the length value L (width value I, respectively) computed automatically and the anticipated length value $L_{init}$ (width value $I_{init}$, respectively) is done in step 50, for example by computing the absolute value of the difference between these two values, and comparing this difference to a predetermined alert threshold.

If the difference is above a predetermined alert threshold, an alert is raised in step 52.

For example, an audio or visual alert is raised via a man-machine interface of the programmable device implementing the invention.

According to one alternative, step 46 comprises the display, on a viewing monitor intended for an operator, of the estimated dimension of the platform and the associated confidence score.

Advantageously, the method according to the invention allows the remote automated computation of a dimension of the moving platform from among its length and width, and thus the validation or non-validation of the self-declaration supplied by this platform.

Advantageously, the automatically computed dimension has an associated confidence score, making it possible to improve the security of the surveillance done.

The invention claimed is:

1. A method of automatically computing a radial dimension of a moving ship, said radial dimension being a length dimension or a width dimension of the ship, the method comprising:
    sending, by a radar system, electromagnetic radio waves toward said ship along a predetermined transmission axis,
    acquiring at least one digital power profile signal representative of a received reflected signal power as a function of a radial distance along said transmission axis relative to a reference point of said radar system,
    filtering the acquired digital power profile signal by a filtering operator to obtain a filtered digital signal, the obtained filtered digital signal being recorded in a memory unit,
    determining, by computation by a processor, a first radial distance corresponding to a first variation peak of the recorded filtered digital signal and a second radial distance corresponding to a second variation peak of the recorded filtered digital signal, and
    computing, by the processor, the radial dimension of the ship as a function of said first and second radial distances.

2. The method according to claim 1, further comprising:
    acquiring a plurality of the at least one digital power profile signal, and
    for each acquired digital power profile signal, filtering by a filtering operator and determining a corresponding first radial distance and a corresponding second radial distance.

3. The method according to claim 1, wherein the computation of the radial dimension of the ship comprises computing an estimated radial length value for each acquired digital power profile signal by obtaining a difference between the second radial distance and the first radial distance, and storing the estimated radial length value for each acquired digital power profile signal.

4. The method according to claim 3, further comprising computing a final estimated radial length from stored estimated radial length values.

5. The method according to claim 4, wherein the final estimated radial length is equal to the median of the stored estimated radial length values.

6. The method according to claim 4, further comprising statistically validating the stored estimated radial length values, and assigning a confidence score associated with the final estimated radial length.

7. The method according to claim 6, wherein the statistical validation comprises computing a histogram of the estimated radial length values, and computing at least one dispersion parameter associated with said histogram.

8. The method according to claim 1, wherein the first radial distance is a smallest radial distance corresponding to a variation peak of the recorded filtered digital signal, and the second radial distance is a largest radial distance corresponding to a variation peak of the recorded filtered digital signal.

9. The method according to claim 1, wherein the determining, by computation, a first radial distance corresponding to a first variation peak of the recorded filtered digital signal and a second radial distance corresponding to a second variation peak of the recorded filtered digital signal comprises a computation, done by applying a sliding window, of a partial discrete integral value of the filtered digital signal comprised in said sliding window and a comparison of the partial integral value to a predetermined variation threshold.

10. The method according to claim 9, wherein the predetermined variation threshold is computed as a function of the total discrete interval of the filtered digital signal.

11. The method according to claim 1, further comprising computing a length dimension or a width dimension as a function of the computed radial dimension and estimating the correlation between the computed length or width dimension and an anticipated length or width dimension, and raising an alert as a function of the result of the correlation estimation.

12. A computer program including software instructions which, when executed by a programmable device, carry out the method for the automatic computation of a dimension of a moving ship, said dimension being a length dimension or a width dimension, according to claim 1.

13. An information recording medium having recorded software instructions for implementing the method according to claim 1, when those software instructions are executed by a programmable device.

14. A system for automatically computing a radial dimension of a moving ship, said radial dimension being a length dimension or a width dimension of the ship, the system comprising:
- an antenna that sends electromagnetic radio waves toward the ship along a predetermined transmission axis; and
- a module that acquires at least one digital power profile signal representative of a received reflected signal power as a function of a radial distance along said transmission axis relative to a reference point of the antenna,
- a computing and processing unit that comprises a processor and at least one memory unit that stores data and program code instructions, implementing:
  - a filtering module for applying a filtering operator on the acquired digital power profile signal to obtain a filtered digital signal and recording the filtered digital signal on one of the at least one memory unit,
  - a determining module for determining, by computation, a first radial distance corresponding to a first variation peak of the recorded filtered digital signal and a second radial distance corresponding to a second variation peak of the recorded filtered digital signal,
  - a computing module for computing the radial dimension of the ship as a function of said first and second radial distances.

* * * * *